US007624053B1

(12) United States Patent
Molotsi et al.

(10) Patent No.: US 7,624,053 B1
(45) Date of Patent: Nov. 24, 2009

(54) EXPORTABLE REPORT TEMPLATES

(75) Inventors: Hugh Molotsi, Cupertino, CA (US); Roger Kimble, Sunnyvale, CA (US); Young-Kyu Yoo, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 1067 days.

(21) Appl. No.: 10/722,118

(22) Filed: Nov. 24, 2003

Related U.S. Application Data

(60) Provisional application No. 60/429,461, filed on Nov. 26, 2002.

(51) Int. Cl.
*G06Q 40/00* (2006.01)
*G06Q 30/00* (2006.01)

(52) U.S. Cl. .......................................... 705/35; 705/14

(58) Field of Classification Search ................... 705/35, 705/14, 36 R, 38, 1, 40, 3, 26; 707/10, 102; 715/255, 234
See application file for complete search history.

(56) References Cited

U.S. PATENT DOCUMENTS

| | | | |
|---|---|---|---|
| 6,505,164 B1 * | 1/2003 | Brunsting et al. | 705/40 |
| 2001/0044781 A1 * | 11/2001 | Shutes | 705/7 |
| 2003/0210428 A1 * | 11/2003 | Bevlin et al. | 358/1.18 |
| 2004/0006533 A1 * | 1/2004 | Lawrence | 705/38 |
| 2004/0033475 A1 * | 2/2004 | Mizuma et al. | 705/14 |
| 2004/0044644 A1 * | 3/2004 | Brady et al. | 707/1 |
| 2004/0205531 A1 * | 10/2004 | Innes et al. | 715/507 |

OTHER PUBLICATIONS

Neiger, David "To The Test" Oct. 2002, Autralian CPA V72N9 pp. 28-29.*
Stevens, Michael G. "Architects of Innovation" Sep. 2002, Practical Accountant 35, 9, 34(8).*
Levey, Steven I. "Vendors Refine Retirement.Estate Planning Software" Jun. 3, 2002, Accounting Today, 16, 10, 20(3).*

* cited by examiner

*Primary Examiner*—Kelly Campen
(74) *Attorney, Agent, or Firm*—Osha • Liang LLP

(57) ABSTRACT

A computer-implemented method for creating reports from financial data in a financial software application includes receiving a selection of a report template to be used to create a report. The report template includes query parameters, layout information, and content field information. The method also includes receiving financial data from a data source, assessing whether the financial data is compatible with the report template by examining a data file type and contents of the financial data to ensure consistency with the selection of the report template and the content field information, and applying the received layout information and received content field information to the received financial data to generate a report having a layout specified by the layout information, and including content associated with the content field information.

12 Claims, 5 Drawing Sheets

Importing Templates

EXPORTABLE REPORT TEMPLATES

CROSS REFERENCE TO RELATED APPLICATIONS

This application claims the benefit of U.S. Provisional Application No. 60/429,461, filed on Nov. 26, 2002, which is incorporated herein by reference.

COPYRIGHT NOTICE

A portion of this disclosure contains material in which copyright is claimed by the applicant. The applicant does not object to the copying of this material in the course of making copies of the application file or any patents that may issue on the application, but all other rights whatsoever in the copyrighted material are reserved.

BACKGROUND OF THE INVENTION

1. Field of the Invention

The present invention relates generally to preparation of reports using financial software applications. More specifically, the present invention is related to the export and import of report templates to allow multiple users to generate reports from the templates.

2. Description of the Related Art

In financial management software, reports convey data about transactions or conditions. For example, reports can be generated to detail sales, purchases, account balances, net worth, etc. A report has both content and a layout. Content is the data presented in the report, whereas a layout defines which content is presented, and the manner in which it is presented. Content and layout are determined according to the purpose of the report. For example, a sales report generated by someone in the hotel and restaurant industry will typically look different and include different content than a report generated by an automobile dealer. Furthermore, report content and layout can change according to the audience that will be receiving the report. For example, a report prepared for a board of directors may include different content or have a different layout than a report generated for shareholders.

Conventional financial applications typically allow some degree of customization of reports, including selecting a layout from a predefined selection of layouts, defining a layout manually, and specifying content fields for inclusion in the report. However, these customized reports are designed on a file-by-file basis, and thus a report configured for use with a particular set of data cannot be used again on another set of data. Instead, the user must recreate the same layout manually.

In view of the foregoing, a need therefore exists for a way of creating report templates that can be used between multiple data files within an application, and between multiple applications.

SUMMARY OF THE INVENTION

The present invention enables the export and import of report templates out of and into financial management application software. Report templates include layout information used to prepare reports generated by the financial management application software. Report templates do not include any actual financial data associated with a user's financial information, but instead include information on how to display data received from a source such as a user's data file, as well as which fields of data to include. This allows one user to create a report template and share it with other users who have similar types of data in order for the other users to create their own reports having the layout specified by the template. This saves the other users the trouble of having to re-create a report layout on their own. Similarly, a single user can reuse a report layout by exporting a template and then importing it for use with a different one of the user's data files. In one embodiment, the present invention also enables exporting and importing of report groups, which include multiple report templates.

In a preferred embodiment, a user creates a report by specifying query parameters and a report layout. The query parameters and layout are then stored independently, i.e. exported from the data they are applied to in creating the report. When a user wishes to import a report template, the user specifies the template to be used, and it is read by the application software. The query parameters and report layout within the report template are then applied to the user's data in order to create a new report having the structure specified by the template. Since the data used to create the report is not stored along with the report template, no privacy concerns are implicated.

BRIEF DESCRIPTION OF THE DRAWINGS

FIG. 6 is a flow chart illustrating a method for exporting report templates in accordance with an embodiment of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

System Architecture

Figure 1:
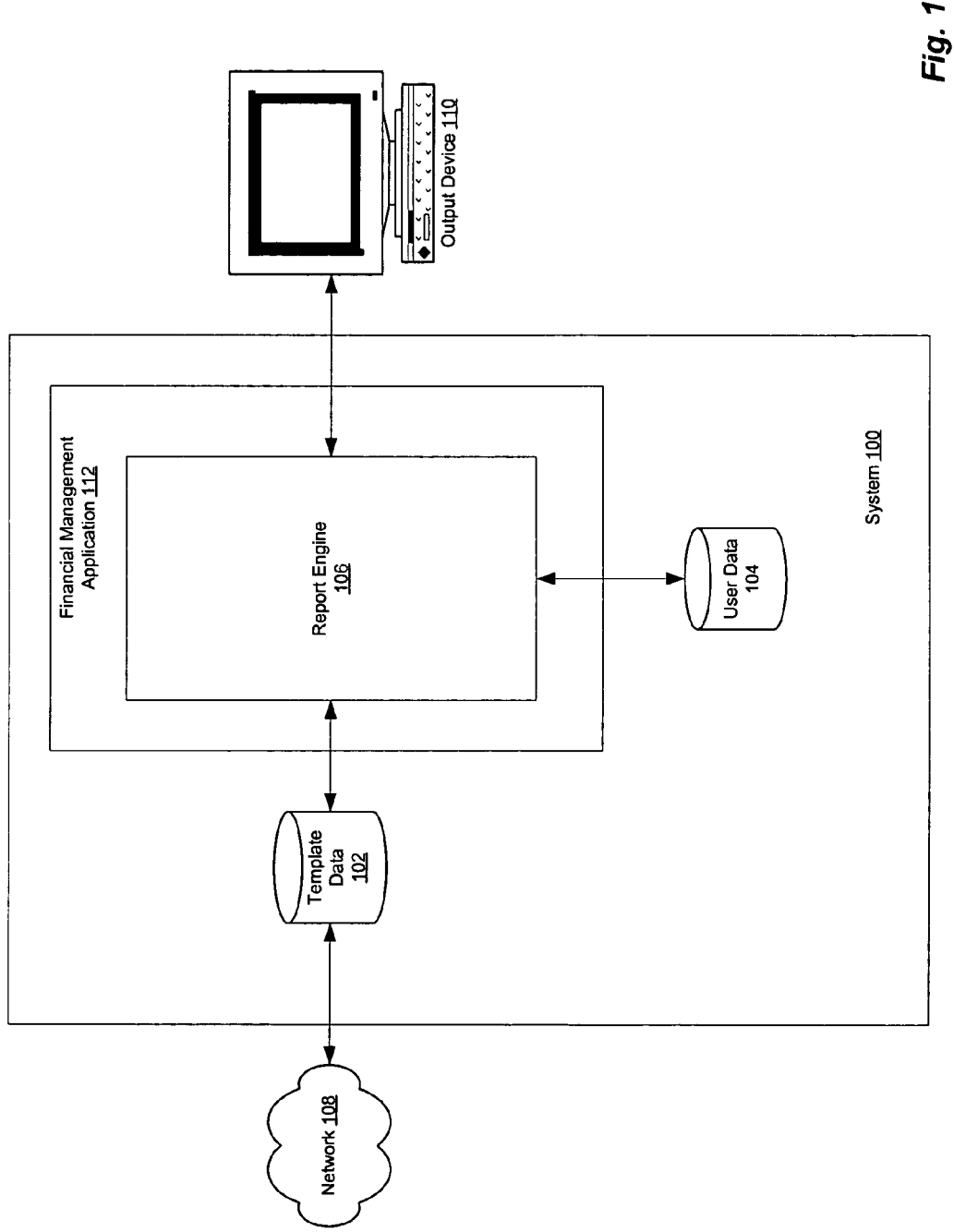
FIG. 1 is a block diagram of a system in accordance with an embodiment of the present invention.

Referring now to FIG. 1, there is shown a block diagram of a system in accordance with an embodiment of the present invention. System 100 includes financial management software application 112, a report engine 106, a template data store 102, and user data store 104. Also shown in FIG. 1 is a network 108 and output device 110.

Financial management software application 112 is preferably personal or business financial software, such as for example Quicken or QuickBooks, available from Intuit, Inc. of Mountain View, Calif. Report engine 106 is preferably a component of software application 112, and in a preferred embodiment prepares reports for output to output device 110 by using template data from template data store 102 and user data from user data store 104 in a manner detailed below. Network 108 is illustrated to demonstrate that template data in template data store 102 may be data received from over a network, for example if a user of system 100 is sharing template files with another user at a remote location. Output device 110 is any device suitable for viewing, printing or storing a report, such as a computer monitor, printer, disk drive, etc. The operation of the components of system 100 is described in grater detail below.

Figure 2:
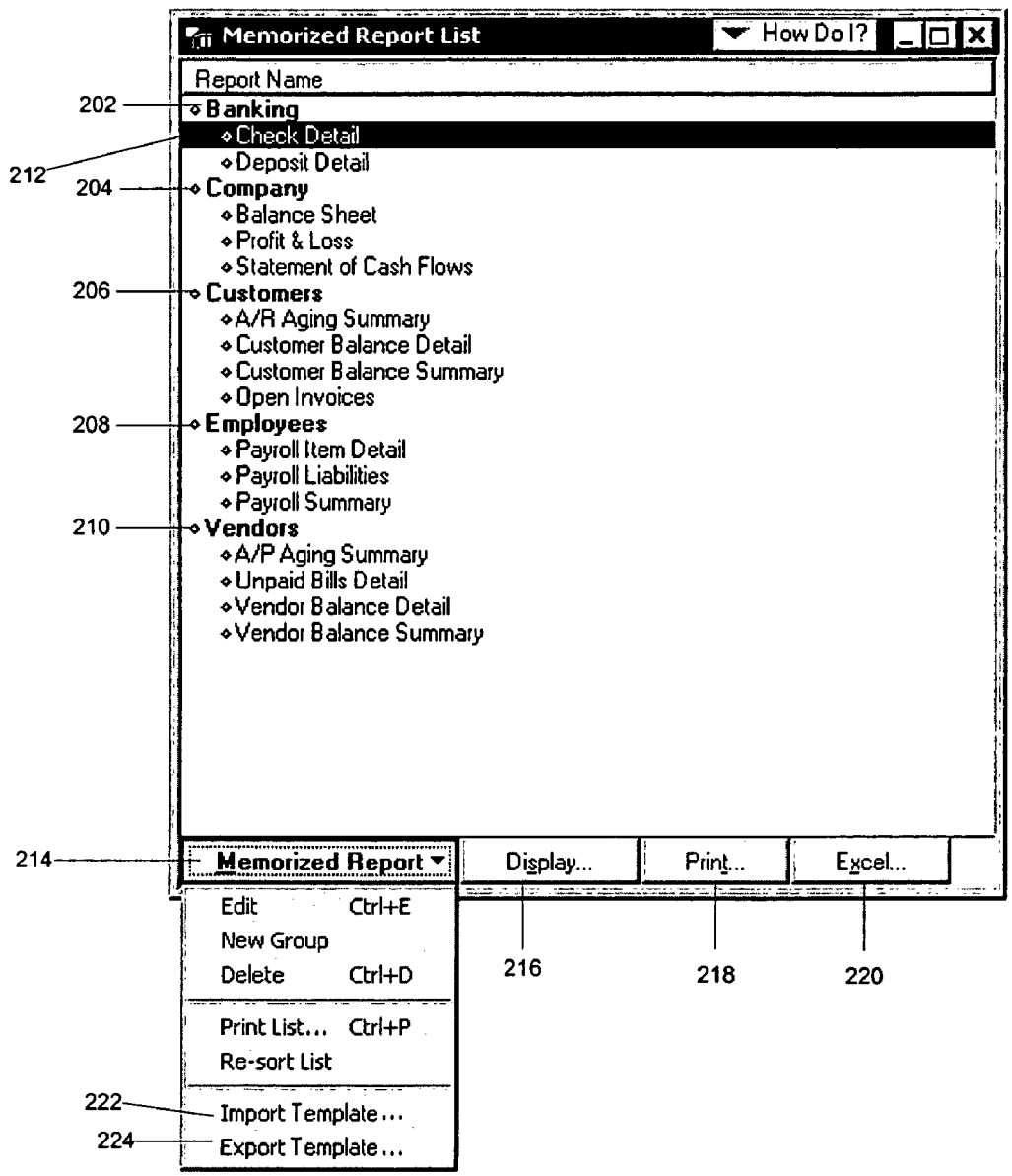
FIG. 2 illustrates a memorized reports list in accordance with an embodiment of the present invention.

In on embodiment, report templates available to be used within a data file open in financial management application 112 are presented in a list format for selection by a user wishing to create a report. These available reports are known in one embodiment as "memorized reports." FIG. 2 provides an example of a memorized reports listing. In the illustrated case, reports are broken down by type, such as Banking 202, Company 204, Customers 206, Employees 208, and Vendors 210. Within each type of report are specific memorized reports, such as for example the check detail report 212, which is a Banking-type report. Function buttons 214, 216, 218, 220 allow a user to access functions related to the memorized report. For example, the user can choose to display 216 or print 218 a report, or export 220 the report to other software such as Microsoft Excel. By choosing the Memorized Report button 214, the user has access to an "Import Template . . . " option 222 and an "Export Template . . . " option 224.

Figure 3:
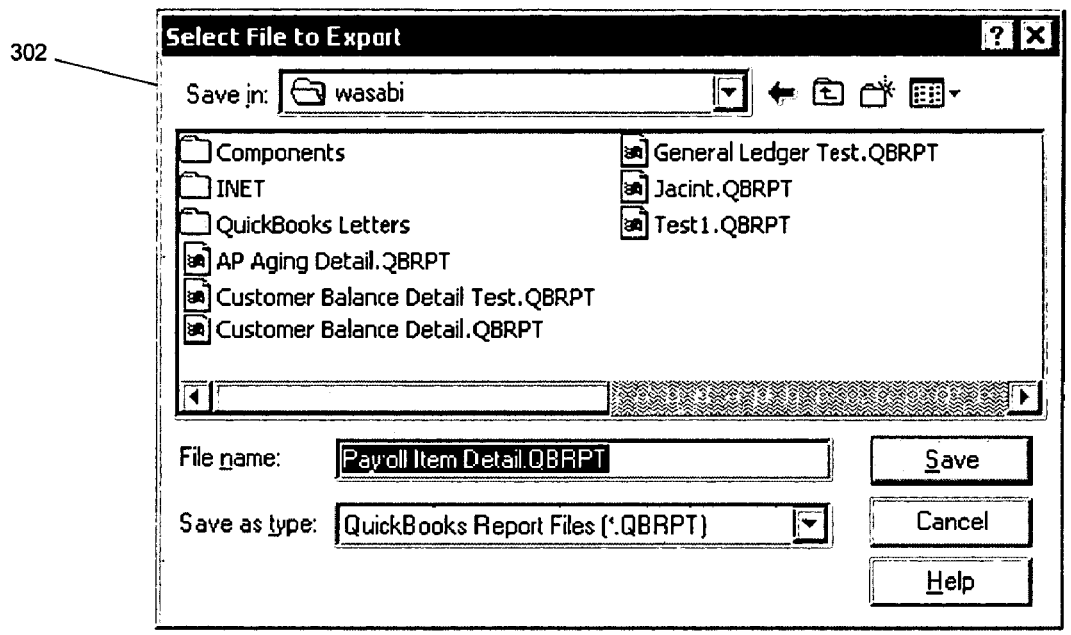
FIG. 3 illustrates a user interface for exporting a report template in accordance with an embodiment of the present invention.

Referring now to FIG. 3, when a user selects the Export Template option, for example by selecting the option 224 from a pull-down menu, she is provided with an export file dialog box 302. From this dialog box, the user can specify a name for the report template being exported. In one embodiment, report templates have their own file type, which in the illustrated case is ".QBRPT". in alternative embodiments, the file type of the report template may differ, as will be appreciated by those of skill in the art.

Figure 4:
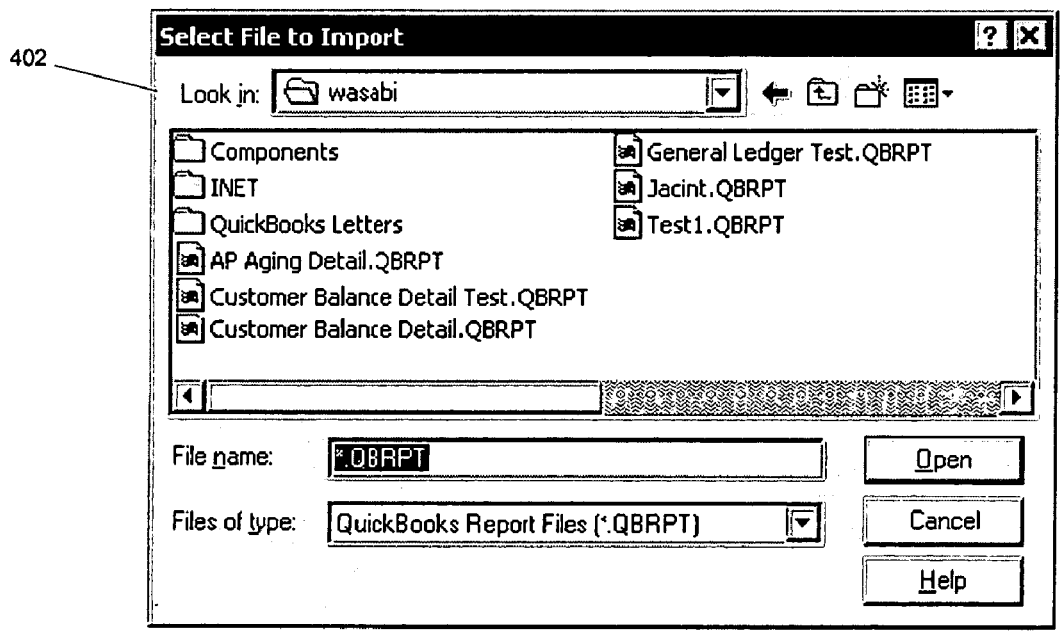
FIG. 4 illustrates a user interface for importing a report template in accordance with an embodiment of the present invention.

Referring now to FIG. 4, when a user selects the Import Template option, for example by selecting the option 222 from a pull-down menu, she is provided with an import file dialog box 402. From this dialog box, the user can select a file to be imported. In one embodiment, only files of a supported file type are viewable in the import file dialog box 402.

Figure 5:
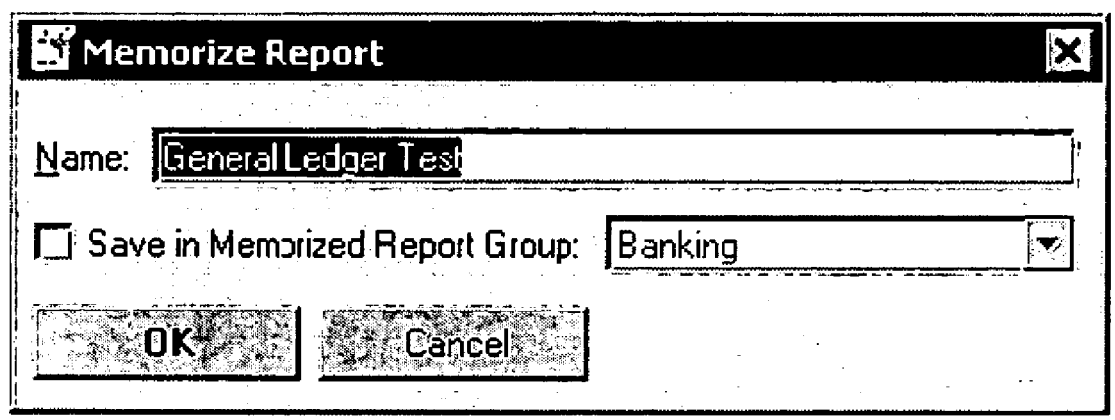
FIG. 5 illustrates a user interface for naming an imported report template in accordance with an embodiment of the present invention.

Once a user chooses a file to import, she is in one embodiment presented with another dialog box in which to specify the name of the report being imported. One example is illustrated in FIG. 5. There, the user has named the report "General Ledger Test." Optionally in one embodiment, the report can be assigned to a specified report type, such as Banking 202.

In one embodiment, the financial account software includes user-level permissions settings, and a user is prevented from exporting a report template if she does not have sufficient permission to generate the report itself. Similar restrictions can optionally be placed on the importing of a report template. Alternatively, any user is allowed to import a template, but must have sufficient permissions in order to actually generate a report once the template imported.

In one embodiment, different versions of a financial services software application product support different functionality. For example, in a basic version of the financial software, a user can import templates, but cannot export templates; in a premium edition of the software, the user can both import and export templates. In an accountant's version, export may be allowed while import is restricted. Those of skill in the art will appreciate that the various combinations of importing and exporting permissions can be implemented in such a manner as to achieve a particular marketing goal.

In one embodiment, during the process of importing a report template, the version of the data file used to create the template is read. If the report template is from a newer version of the data file, the software prevents the user from importing the report template. This restriction motivates users to upgrade to the latest version of the financial accounting software to maintain compatibility.

Exporting Groups

In one embodiment, a user can export and import a group of report templates. Referring again to FIG. 2, in one embodiment if the user selects a group such as "Banking" 202, then all of the report templates within the Banking group 202 are exported, preferably to a single file. The single file may have a different file suffix to indicate that it contains a group of templates instead of a single template, or may have a different file name, for example including the word "Group". In an alternative embodiment, both a single report and a report group are saved as a file with an identical extension, such as .QBR. When imported, the group header and report templates within the group are added to the available templates as described above with respect to a single template.

In one embodiment, some aspects of a report cannot be exported. When a report has content fields that are specific to a particular data file, report engine 106 disallows export. Examples include reports having content fields specifying a certain account, customer, job, vendor, employee, or item. Because other users are unlikely to have the same accounts (or customers, jobs, items, etc.) as the user creating the report, such a report would not work in the other users' company files.

Any user who has compatible software can import report templates. In a preferred embodiment, if a user attempts to import a report template, and an update or version incompatibility exists, a warning message appears.

In an additional embodiment, report templates are provided over the World Wide Web, e.g., by making the templates available for download through a Web service, either free or in exchange for payment.

Referring now to FIG. 6, there is shown a flow chart illustrating a method for exporting report templates in accordance with an embodiment of the present invention. First, a user creates 602 a report by specifying the content and the layout of the report. Content of the report includes the data that is to be included in the report, and is typically identified by a field name. For example, in a report detailing a user's cash flow, content might include dates, payee's, accounts, categories, amounts, and memo fields. Alternatively, the user may choose to include only a subset of the available data in creating the report, for example leaving out the memo field. Layout of the report includes such things as the format of the report, e.g., tabular, graphical, etc., organization of the data, font size, sorting, and other choices that affect how the content is presented to the user in the report. Once the user has specified the content and layout of the report, the report is generated by the application program. Typically this involves the specifying and executing of various query parameters by the application program in a way that is transparent to the user, who sees only the report that is the end product.

In a preferred embodiment, the structure of the report—that is the layout of the report and the content fields, but not any of the data itself—is extracted 604 from the report. Alternatively, the structure of the report is determined at the time the report is initially generated. In either case, the report structure is then saved 606 as a template for later access as described below with respect to FIG. 7.

Figure 7:
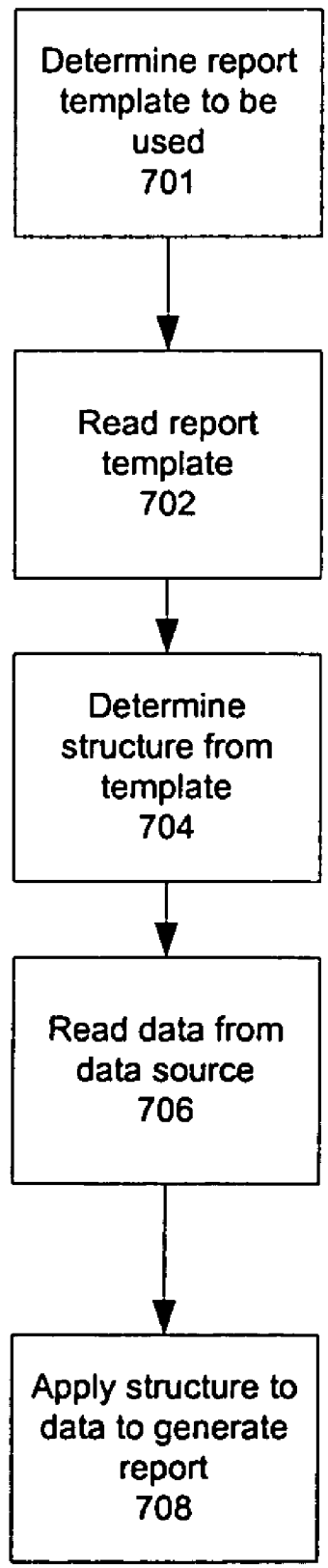
FIG. 7 is a flow chart illustrating a method for importing report templates in accordance with an embodiment of the present invention.

FIG. 7 is a flow chart illustrating a method for importing report templates in accordance with an embodiment of the present invention. A user wishing to generate a report based on a report template selects 701 a template to be used from among a list of available templates. Available templates are those that have been created by the user and then exported, or that have been made available by the software application provider, or by third parties. Next, the software application program reads 702 the selected report template and determines 704 a correct structure for the report, including the content fields and layout. The software application then reads 706 data from the user's data source, and applies 708 the structure specified by the report template to the data read in, in order to generate the report in the manner specified by the template.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of the repor engine and so forth may be provided in many or one module.

Some portions of the above description present the feature of the present invention in terms of algorithms and symbolic representations of operations on information. These algorithmic descriptions and representations are the means used by those skilled in the financial software application arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A computer-implemented method for creating reports from financial data in a financial software application executing on a processor, the method comprising:
   receiving a selection of a report template for creating a report,
      wherein the report template is selected by a first user of the financial software application,
      wherein the report template includes query parameters, layout information, and content field information stored independently of financial data,
      wherein the report template is created by the financial software application used by a second user, and
      wherein the first user and the second user are different;
   receiving financial data from a data source;
   assessing, using the processor, whether the financial data is compatible with the report template by examining a data file type and contents of the financial data to ensure consistency with the selection of the report template and the content field information; and
   applying, using the processor, the received layout information and received content field information to the received financial data to generate a report, the report having a layout specified by the layout information, and including content associated with the content field information.

2. The method of claim 1 further comprising outputting the report to an output device.

3. The method of claim 2 wherein the output device is a computer monitor.

4. The method of claim 2 wherein the output device is a printer.

5. The method of claim 2 wherein the output device is a storage medium.

6. The method of claim 1 wherein the data source is a storage device.

7. The method of claim 1 wherein the report template is selected using the Internet.

8. The method of claim 7 further comprising storing the report template locally.

9. The method of claim 1, wherein the report template includes version information, and prior to applying the received layout information and received content field information to the received financial data, the template version is compared to a version associated with the received financial data to determine whether the financial data is compatible with the selected template.

10. The method of claim 9 further comprising:
responsive to a determination that the financial data is compatible with the report template, generating the report.

11. A system for creating reports and a report template from financial data in a financial software application, the system comprising:
a template data store for receiving a selection of a report template, by a first user of the financial software application, and storing the report template,
wherein the report template includes query parameters, layout information, and content field information stored independently of financial data, and used to generate a report,
wherein the report template is created by a second user of the financial software application, and
wherein the first and second user are different;
a user data store for storing user financial data; and
a report engine, communicatively coupled to the template data store and the user data store, for receiving template data from the template data store and user data from the user data store, generating reports by applying the template data to the user data, and generating the report template by extracting query parameters, content fields, and report layout information from reports and exporting the report template.

12. A computer program product for creating reports and a report template from financial data in a financial software application, the computer program product stored on a computer readable medium and containing instructions configured to cause a processor to execute the steps of:
receiving a selection of a report template for creating a report,
wherein the report template is selected by a first user of the financial software application,
wherein the report template includes query parameters, layout information, and content field information stored independently of financial data,
wherein the report template is created by the financial software application used by a second user, and
wherein the first and second user are different;
receiving financial data from a data source;
assessing whether the financial data is compatible with the report template by examining a data file type and contents of the financial data to ensure consistency with the selection of the report template and the content field information;
applying the received layout information and received content field information to the received financial data to generate a report, the report having a layout specified by the layout information, and including content associated with the content field information; and
generating the report template by extracting the query parameters, content fields, and report layout information from reports.

* * * * *